United States Patent
Haremaki et al.

(10) Patent No.: US 9,364,869 B2
(45) Date of Patent: Jun. 14, 2016

(54) TURRET-TYPE CLEANING APPARATUS

(75) Inventors: Hiroki Haremaki, Toyama (JP); Toru Sumiyoshi, Asahi-machi (JP); Masaaki Sugimura, Namerikawa (JP)

(73) Assignee: Sugino Machine Limited, Uozu-shi, Toyama (JP)

( * ) Notice: Subject to any disclaimer, the term of this patent is extended or adjusted under 35 U.S.C. 154(b) by 938 days.

(21) Appl. No.: 13/227,102

(22) Filed: Sep. 7, 2011

(65) Prior Publication Data

US 2012/0080060 A1 Apr. 5, 2012

(30) Foreign Application Priority Data

Sep. 10, 2010 (JP) ................................ 2010-203202

(51) Int. Cl.
*B08B 3/04* (2006.01)
*B08B 1/00* (2006.01)
*B08B 3/02* (2006.01)

(52) U.S. Cl.
CPC ... *B08B 3/04* (2013.01); *B08B 1/00* (2013.01); *B08B 3/02* (2013.01)

(58) Field of Classification Search
CPC ................ B08B 1/00; B08B 3/02; B08B 3/04
USPC .................................................. 134/70, 99.1
See application file for complete search history.

(56) References Cited

U.S. PATENT DOCUMENTS

| 3,979,819 | A | * | 9/1976 | Nomura et al. ................. 483/39 |
| 5,488,964 | A | * | 2/1996 | Murakami et al. ........... 134/95.3 |
| 2003/0010362 | A1 | * | 1/2003 | Scranton et al. ................ 134/30 |
| 2004/0118457 | A1 | * | 6/2004 | Sugata et al. ................. 137/434 |

FOREIGN PATENT DOCUMENTS

| CA | 2718243 A1 * | 9/2009 | |
| CN | 1579703 | 2/2005 | |
| CN | 201094955 | 8/2008 | |
| DE | 102009022815 B3 * | 11/2010 | ............ B23B 29/323 |
| EP | 0 669 187 | 8/1995 | |
| JP | 8-090365 A | 4/1996 | |
| JP | 2000-350968 | 12/2000 | |
| JP | 2002-001173 | 1/2002 | |

(Continued)

OTHER PUBLICATIONS

Chinese Office Action for corresponding application No. 201110267273.9 dated Nov. 4, 2013, 9 pages.

*Primary Examiner* — David Cormier
*Assistant Examiner* — Irina Graf
(74) *Attorney, Agent, or Firm* — Merchant & Gould P.C.

(57) ABSTRACT

A turret-type cleaning apparatus for using cleaning liquid, and deburring and cleaning a workpiece includes: cleaning tools for spraying the liquid onto the workpiece and deburring and/or cleaning it; a turret head freely turnable and where the tools are attached; a turret drive device connected to the head and for turning the head; a cleaning chamber where the head is arranged; a cleaning bath installed in the chamber; a drain port openably and closably provided below the bath and for draining the liquid from the bath; a first cleaning liquid supply flow passage configured to supply the liquid to one of the tools; a second cleaning liquid supply flow passage for supplying the liquid to the bath; and a cleaning liquid supply source for supplying the liquid to the first cleaning liquid supply flow passage and the second cleaning liquid supply flow passage.

2 Claims, 11 Drawing Sheets

(56) References Cited

FOREIGN PATENT DOCUMENTS

| JP | 2002-086080 A | 3/2002 |
| JP | 2002-086094 A | 3/2002 |
| JP | 2002-273640 | 9/2002 |
| JP | 2004-141811 A | 5/2004 |
| JP | 4203298 | 12/2008 |
| WO | WO-2010062894 A1 * 6/2010 | ................ B08B 3/02 |

* cited by examiner

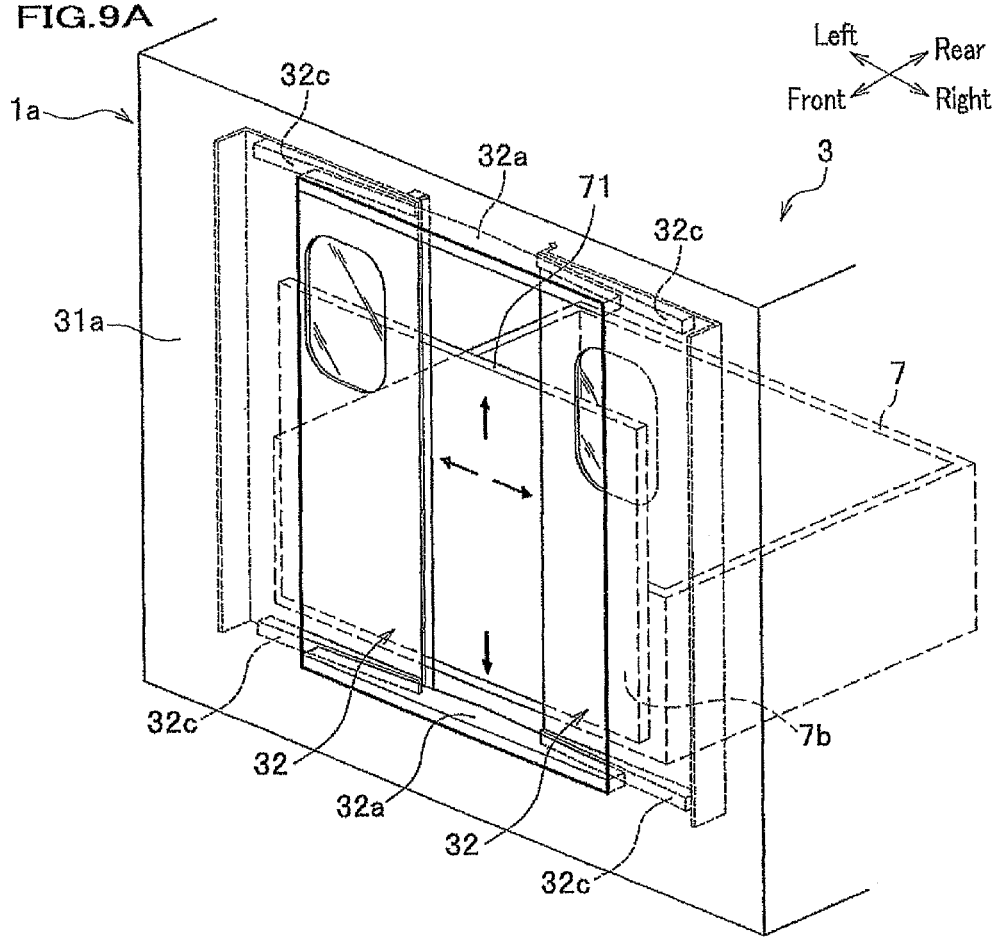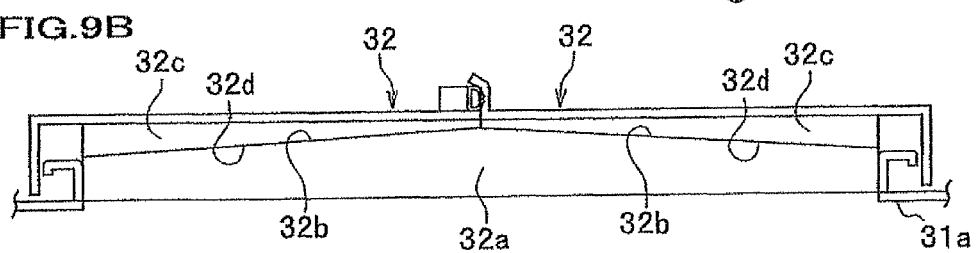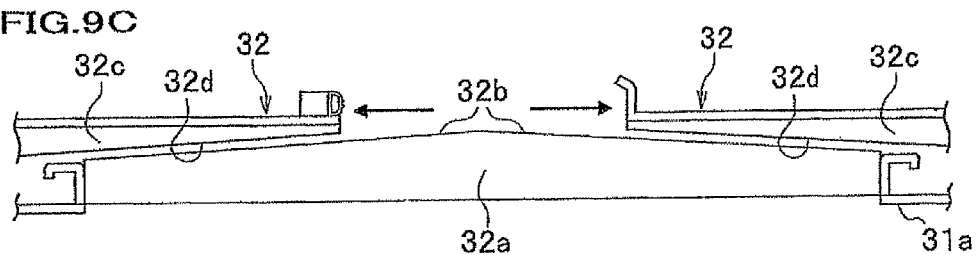

ly performed when the workpiece is ground).

TURRET-TYPE CLEANING APPARATUS

This application claims benefit of Serial No. 2010-203202, filed 9 Sep. 2010 in Japan and which application is incorporated herein by reference. To the extent appropriate, a claim of priority is made to each of the above disclosed applications.

BACKGROUND OF THE INVENTION

1. Field of the Invention

The present invention relates to a turret-type cleaning apparatus for deburring and cleaning (washing) a workpiece in order to removing a chip adhered thereto (hereinafter referred to as "chip" including such a chip and an abrasive dropped when the workpiece is ground).

2. Description of the Related Art

Conventionally, as one of apparatuses for deburring and cleaning a bored workpiece, there is a turret-type cleaning apparatus (turret-type deburring and cleaning apparatus).

As such a turret-type cleaning apparatus, for example, an apparatus is known that cleans a workpiece by spraying a cleaning liquid in a gravity direction or a left-and-right direction with respect to the workpiece and by flowing out a burr and a chip together with the cleaning liquid when removing the burr and the chip inside a precision part such as a transmission case and a cylinder head mounted on an automobile (for example, see FIGS. 1 to 4 in Japanese Patent No. 3065905). This turret-type cleaning apparatus is an open-air cleaning apparatus As other cleaning apparatuses, such apparatuses are known for generating eddy currents inside a workpiece and cleaning it uniformly by spraying a cleaning liquid onto the workpiece in a state of immersing the workpiece in a cleaning liquid (for example, see FIGS. 9-12 in Japanese Patent No. JP 4203298; "WHAT IS CLAIMED IS" in Japanese Patent No. JP 3788899; and FIGS. 1, 2, and 4 in Japanese Patent No. JP 3739035). These cleaning apparatuses are submerged cleaning apparatuses for removing a burr and a chip, which are generated in a shape region inside a workpiece, in a cleaning liquid of a cleaning bath.

However, with respect to submerged cleaning apparatuses such as described in Japanese Patent Nos. JP 4203298, JP 3788899, and JP 3739035, a removal work of removing an adhesion matter adhered to a workpiece is indispensable, when the workpiece is cleaned by nothing but the submerged cleaning since suspended solids such as chips suspending in a cleaning liquid of a cleaning bath adhere to the workpiece in draining the cleaning liquid. With respect to a conventional submerged cleaning apparatus, the apparatus cannot sufficiently clean a workpiece, and it is indispensable to move the workpiece from a cleaning bath to another place, to additionally perform the open-air cleaning and the like, and to remove the adhesion matter; therefore, there is a problem that the apparatus cannot efficiently deburr and clean the workpiece.

Furthermore, with respect to the turret-type cleaning apparatus for the open-air cleaning described in Japanese Patent No. 3065905, there is a problem that a whole of the apparatus has a large-scale structure and the apparatus results in a large size in order to enable the apparatus to efficiently and surely perform deburring and cleaning in accordance with various workpieces since a cleaning chamber where a cleaning bath is provided is indispensable other than a processing space where an exclusive table is provided for the open-air cleaning.

SUMMARY OF THE INVENTION

Consequently, the present invention is originated to solve the above mentioned problems and provides a turret-type cleaning apparatus that can efficiently perform submerged cleaning and open-air cleaning.

In order to solve the above mentioned problems, a turret-type cleaning apparatus according to a first aspect of the present invention uses cleaning liquids, deburrs and cleans a workpiece, and comprises: cleaning tools configured to spray one of the cleaning liquids onto the workpiece and to deburr and/or clean the workpiece; a turret head configured to be freely turnable and to which the cleaning tools are attached; a turret drive device connected to the turret head and configured to turn the turret head and to select the one of the cleaning tools; a cleaning chamber where the turret head is arranged; a cleaning bath installed in the cleaning chamber a first cleaning liquid supply flow passage configured to supply the one of the cleaning liquids to the cleaning tool; a second cleaning liquid supply flow passage configured to supply the other of the cleaning liquids to the cleaning bath; a cleaning liquid supply source configured to supply the cleaning liquids to the first cleaning liquid supply flow passage and the second cleaning liquid supply flow passage; and a drain port openably and closably provided below the cleaning bath and configured to drain the cleaning liquids in the cleaning bath.

According to the configuration of the turret-type cleaning apparatus thus described, the apparatus can spray the cleaning liquid so as to shoot at a place where a burr of a workpiece exists and can perform open-air cleaning by spraying the liquid onto the workpiece from a cleaning tool selected by turning the turret head. Moreover, the turret-type cleaning apparatus can perform submerged cleaning and semi-submerged cleaning by hitting the cleaning liquid sprayed from the cleaning tool in a state of immersing the workpiece in the cleaning liquid in the cleaning bath.

Furthermore, because the turret-type cleaning apparatus can perform cleaning in combination of the submerged cleaning, the semi-submerged cleaning, and the open-air cleaning, the apparatus can drop a chip adhered to a workpiece, for example, by discharging the cleaning liquids in the cleaning bath and performing the open-air cleaning without moving the workpiece in the cleaning bath even if the chip and the like are adhered to the workpiece in performing the submerged cleaning. Therefore, the turret-type cleaning apparatus can eliminate that the burr and the chip adhere to a surface of the workpiece and remain after cleaning the workpiece, and can efficiently and surely deburr and clean the workpiece in a limited space.

Furthermore, the turret-type cleaning apparatus efficiently perform deburring and cleaning by a most suitable cleaning tool and cleaning method, depending on workpieces having various shapes, because the apparatus can perform the submerged cleaning, the semi-submerged cleaning, and the open-air cleaning in the workpiece by the cleaning liquid sprayed from a cleaning tool selected from a plurality of kinds of the cleaning tools attached to the turret head.

Furthermore, because the turret-type cleaning apparatus can perform a plurality of kinds of cleanings—in a same cleaning chamber, the apparatus can flexibly address to clean workpieces in a limited space; therefore, the apparatus can provide a small size cleaning apparatus that can perform cleaning miscellaneous workpieces.

A turret-type cleaning apparatus according to a second aspect of the invention is the apparatus having the configuration described in the first aspect, and the cleaning liquid supply source comprises: a high pressure pump configured to pressurize the one of the cleaning liquids supplied to the cleaning tools from the first cleaning liquid supply flow passage; a liquid-supply-tank supply pump configured to pressurize the other of the cleaning liquids supplied to the cleaning bath from the second cleaning liquid supply flow passage; and a cleaning liquid circulation mechanism including: a cleaning liquid supply tank configured to be arranged at a position higher than the cleaning bath, to be connected with the second cleaning liquid supply passage, and to reserve the other of the cleaning liquids; a drain flow passage configured to drain the cleaning liquids from the cleaning chamber; and at least one of filtration devices configured to filtrate the cleaning liquids sent from the drain flow passage, wherein the liquid-supply-tank supply pump supplies to the cleaning liquid supply tank the cleaning liquids sent from the drain flow passage or the cleaning liquids filtrated by at least one of the filtration devices, and wherein the high pressure pump supplies to the cleaning tool the cleaning liquid filtrated by at least one of the filtration devices.

According to the configuration of the turret-type cleaning apparatus thus described, the apparatus can use the cleaning liquids purified over a long period without waste by efficiently recovering and circulating both of the cleaning liquids supplied to two places by means of the cleaning liquid circulation mechanism, and by filtrating the cleaning liquids by means of at least one of the filtration devices, wherein the one of the cleaning liquids is sprayed from the cleaning tool onto the workpiece and cleans the workpiece, and the other thereof is supplied to the cleaning bath.

A turret-type cleaning apparatus according to a third aspect of the invention is the apparatus having the configuration described in the first or second aspect and further comprises flow volume adjustment devices configured to respectively adjust a supply flow volume of the other of the cleaning liquids, and a drain flow volume of the cleaning liquids.

The turret-type cleaning apparatus thus configured comprises the flow volume adjustment devices; thereby the apparatus can automatically adjust the supply flow volume and drain flow volume of the cleaning liquids to optimum flow volumes for cleaning and/or deburring the workpiece, and perform a cleaning work thereof.

A turret-type cleaning apparatus according to a fourth aspect of the invention is the apparatus having the configuration described in any one of the first to third aspects: the cleaning chamber comprises a first opening-and-closing body formed at an inner wall of the cleaning chamber and configured to open and close a cleaning chamber carrying-in-and-out port for carrying the workpiece in and out of the cleaning chamber; and the cleaning bath comprises a second opening-and-closing body formed on side faces of the cleaning bath and configured to open and close a cleaning bath carrying-in-and-out port for carrying the workpiece in and out of the cleaning bath.

According to the configuration of the turret-type cleaning apparatus thus described, the first opening and closing body configured to open and close the cleaning chamber carrying-in-and-out port is arranged in the cleaning chamber, and further, the second opening and closing body configured to open and close the cleaning bath carrying-in-and-out port is arranged in the cleaning bath, and thereby, a periphery of the cleaning bath where the cleaning of the workpiece is performed is covered by the two opening and closing bodies; therefore, the apparatus can prevent the cleaning liquid from spattering on the side of the cleaning chamber carrying-in-and-out port and leaking outside the cleaning chamber in cleaning.

Furthermore, by providing the cleaning bath carrying-in-and-out port in the side wall of the cleaning bath, a carrying-in work of the workpiece is easy because it is possible to horizontally move the workpiece into the cleaning bath from the cleaning bath carrying-in-and-out port; therefore, it is possible to easily carry the workpiece into the cleaning bath even if the workpiece is a heavy one with various shapes.

Moreover, by opening and closing the cleaning bath carrying-in-and-out port by means of the second opening and closing body, it is possible to freely form the cleaning bath for reserving the cleaning liquids. Because the cleaning bath thus formed freely open and close the second opening and closing body also functioning as a side wall, it is possible to easily perform cleaning of an inside of the cleaning bath, an inspection operation thereof, and the carry-in of a workpiece therein.

A turret-type cleaning apparatus according to a fifth aspect of the invention is the apparatus having the configuration described in any one of the first to fourth aspects, and the cleaning chamber further comprises a turn unit configured to turn the workpiece arranged in the cleaning bath; and a turn drive unit arranged outside the cleaning bath and configured to drive the turn unit.

According to the configuration of the turret-type cleaning apparatus thus described, because the apparatus can freely turn the workpiece in the cleaning bath by the turn unit and change a direction of the workpiece, it is possible to direct a cleaned place of the workpiece to a direction in accordance with that of the cleaning tool and to efficiently clean the workpiece when deburring and cleaning the workpiece by the cleaning liquid sprayed from the cleaning tool.

Furthermore, the turn unit comprises the turn drive device configured to turn the workpiece and arranged outside the cleaning bath; thereby the apparatus can prevent the cleaning liquid from entering in a place precisely processed and prevent damage from occurring inside the apparatus by bounces of a burr and a chip (burrs and chips) due to the liquid sprayed.

A turret-type cleaning apparatus according to a sixth aspect of the invention is the apparatus having the configuration described in any one of the first to fifth aspects, and spaces are provided on four side faces and both top and bottom faces of the cleaning bath, and the cleaning bath is independently arranged in the cleaning chamber.

According to the configuration of the turret-type cleaning apparatus thus described, the spaces formed around the peripheral portion of the cleaning bath play a role of a cushion, in particular, a propagation of cavitation sound generated in the cleaning bath is suppressed, and it is possible to reduce noise.

A turret-type cleaning apparatus according to a seventh aspect of the invention is the apparatus having the configuration described in any one of the first to sixth aspects, and a drive source configured to rotate the cleaning tools, a drive source of the turret drive device, and a drive source of the turn drive device are arranged outside the cleaning chamber.

According to configuration of the turret-type cleaning apparatus thus described, each of the drive sources that are apt to be broken down if those are wetted is arranged at the outside of the cleaning chamber where the drive sources are not wetted with the cleaning liquid; thereby, it becomes difficult for each of the drive sources to be broken down, and it is possible to reduce cost generated when each of the drive sources is broken down. 16

A turret-type cleaning apparatus according to an eight aspect of the invention is the apparatus having the configuration described in any one of the fifth to seventh aspects, and further comprises a pallet configured to hold the workpiece, and a convey device configured to convey the pallet from the cleaning bath carrying-in-and-out port to the turn unit in the cleaning bath.

According to the configuration of the turret-type cleaning apparatus thus described, the apparatus comprises the convey work, thereby can efficiently perform the convey work of sending the workpiece together with the pallet and the convey work of returning those to an original position; therefore, it is possible to easily covey and clean the workpiece in a short time even if the workpiece is a large size and heavy.

A turret-type cleaning apparatus according to a ninth aspect of the invention is the apparatus having the configuration described in any one of the first to eighth aspects, and an air blow-off port of an air blow device configured to blow off air onto the workpiece is provided in the cleaning chamber.

According to the configuration of the turret-type cleaning apparatus thus described, the air blow-off port of an air blow device configured to blow off air onto the workpiece is provided in the cleaning chamber; thereby the apparatus can easily remove an adhesion matter such as a chip and the cleaning liquid adhered to the workpiece by blowing air on the workpiece and blowing away the adhesion matter.

According to any one of the turret-type cleaning apparatuses of the invention, it is possible by means of the one apparatus to efficiently perform submerged cleaning, semi-submerged cleaning, and open-air cleaning, depending on a shape and the like of the workpiece by turning the turret head, where a plurality of cleaning tools are attached, and by appropriately selecting a cleaning tool suitable for any one of the submerged cleaning, the semi-submerged cleaning, and the open-air cleaning. Furthermore, according to the turret-type cleaning apparatus, it is possible to remove the adhesion matters by performing the open-air cleaning to the workpiece by the same apparatus even if a chip and the like adhere to the workpiece during the submerged cleaning or the semi-submerged cleaning.

BRIEF DESCRIPTION OF THE DRAWINGS

FIGS. 9A, 9B, and 9C show a configuration of a slide door: FIG. 9A is a main-portion enlarged perspective view thereof, FIG. 9B is a main-portion vertical enlarged plan view showing a state of the door being closed; and FIG. 9C is a main-portion vertical enlarged plan view showing a state of the door being opened.

FIG. 10A is a main-portion enlarged perspective view thereof, FIG. 10B is a main-portion vertical enlarged plan view showing a state of the door being closed; and FIG. 10C is a main-portion vertical enlarged plan view showing a state of the door being opened.

BEST MODE(S) FOR CARRYING OUT THE INVENTION

Hereinafter will be described a turret-type cleaning apparatus 1 according to an embodiment of the present invention with reference to drawings. In advance of a description of the turret-type cleaning apparatus 1 according to the embodiment, a workpiece W (see FIG. 3) deburred and cleaned by the apparatus 1 will be described.

<<Configuration of Workpiece>>

Figure 3:
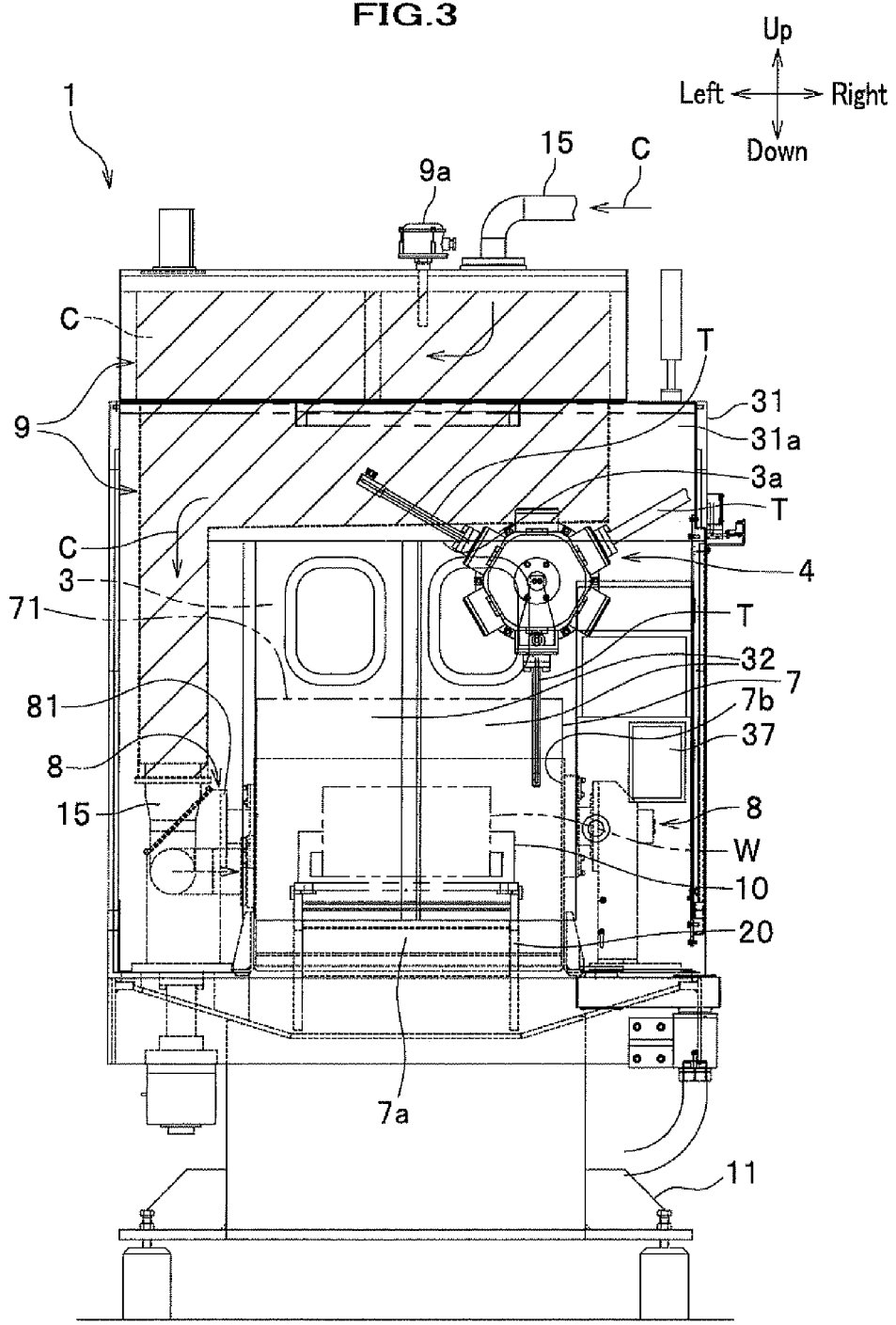
FIG. 3 is a front view showing the turret-type cleaning apparatus according to the embodiment.

The workpiece W shown in FIG. 3 may be an object that can be deburred and/or cleaned with a high pressure cleaning liquid (water jet), and none of a material, shape, and usage of the workpiece W is not specifically limited. As the workpiece W of the object processed by the turret-type cleaning apparatus 1, a metal product, a resin product, and the like are especially available. Moreover, citing a specific example of the workpiece W, in case of performing submerged cleaning thereto by the turret-type cleaning apparatus 1, a cylinder head, a cylinder block, a lost-wax cast component, and the like are suitable as the workpiece W. Furthermore, as the workpiece W in case of performing the open-air cleaning thereto by the turret-type cleaning apparatus 1, a transmission case, a crankshaft, an ABS (Antilock Brake System) body, a hydraulic valve body, and the like are suitable. As the workpiece W, in case of deburring and cleaning it by the turret-type cleaning apparatus 1, the ABS body, the hydraulic valve body, a tool such as a drill and a bite, a connector, a valve body, a resin molded product such as a transistor and a diode, and the like are suitable.

Hereinafter will be described the turret-type cleaning apparatus 1, citing a case of a cylinder block as an example of the workpiece W.

Figure 4:
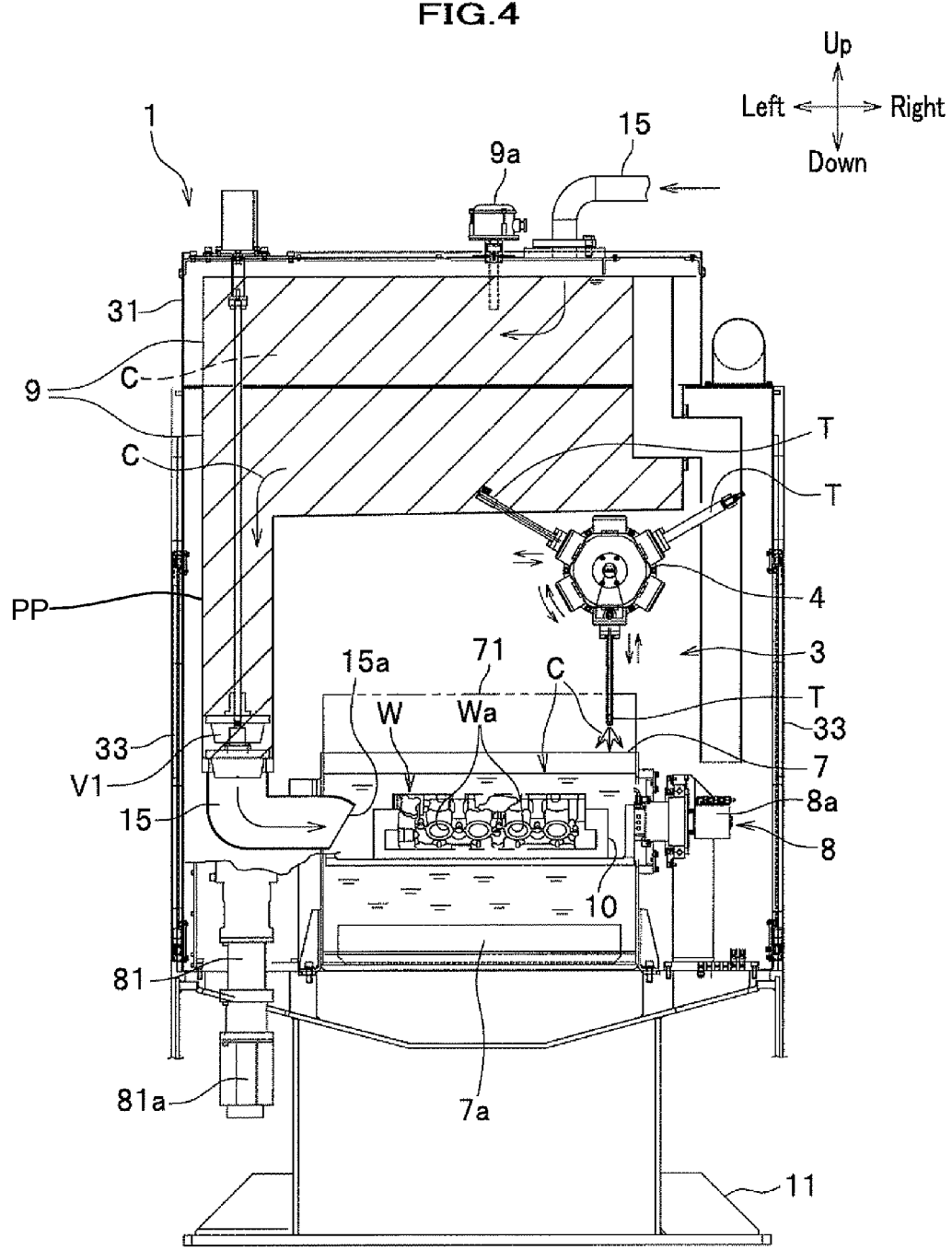
FIG. 4 is a schematic section view of the turret-type cleaning apparatus seen along a line S-S in a direction indicated by arrows in FIG. 1 and showing a cleaning chamber of the apparatus according to the embodiment.

As shown in FIG. 4, the workpiece W is, for example, the cylinder block of a V-type eight-cylinder engine, and a plurality of cylinders Wa (bores) are formed.

<<Configuration of Turret-Type Cleaning Apparatus>>

Figure 1:
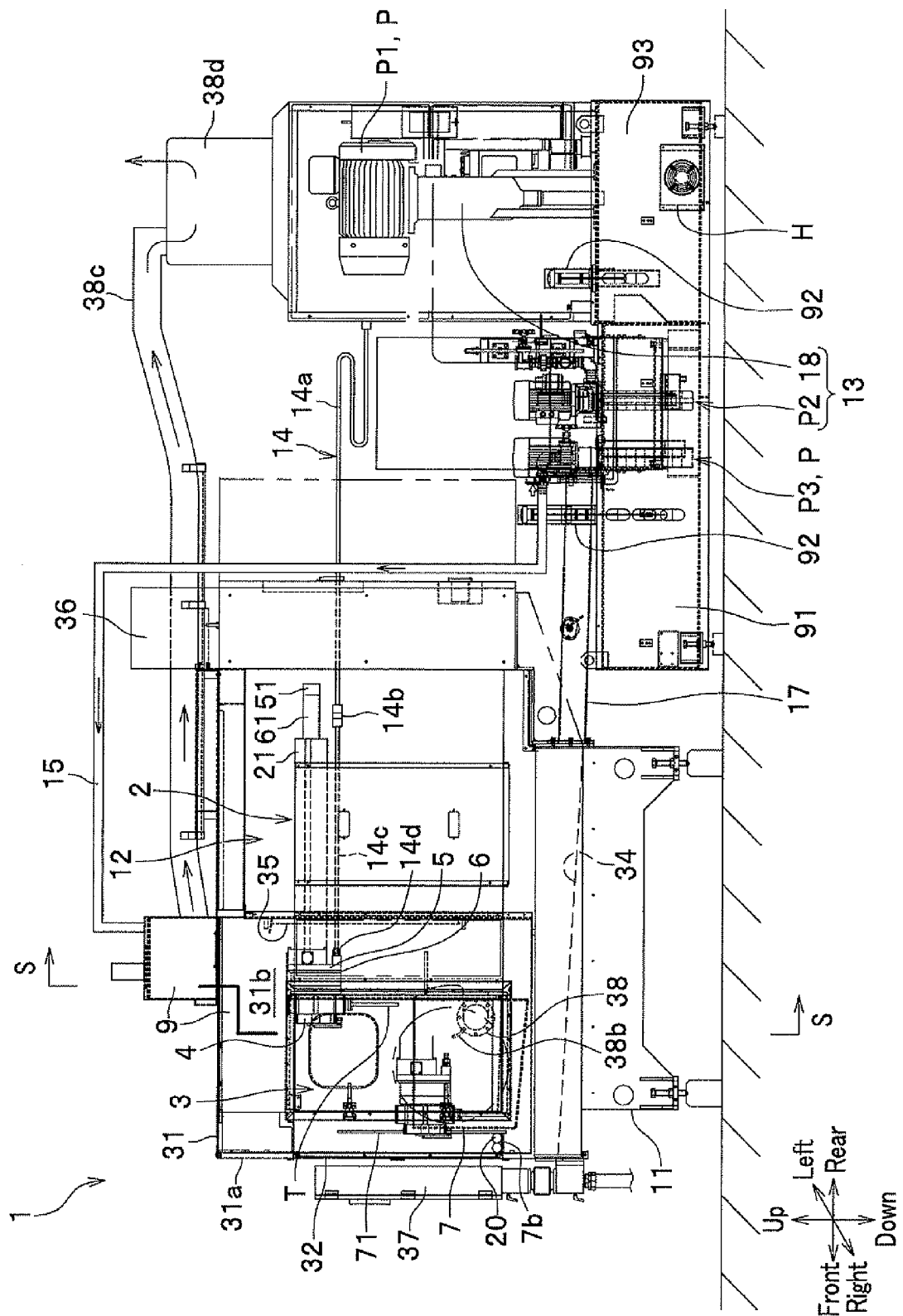
FIG. 1 is a left side view showing a turret-type cleaning apparatus according to an embodiment of the present invention.

As shown in FIG. 1, the turret-type cleaning apparatus 1 comprises a plurality of individually different cleaning tools T configured to clean the workpiece W (see FIG. 3), selects a cleaning tool T most suitable for such a shape of a cleaned place of the workpiece W in cleaning it, and deburrs and cleans it. The turret-type cleaning apparatus 1 is adapted to be able to perform the submerged cleaning, semi-submerged cleaning, and the open-air cleaning by spraying a cleaning liquid C (hereinafter referred to as "one of cleaning liquids C" as needed, see FIG. 4) into cleaning liquids C (mixed by the one of the cleaning liquids C, and the other of the cleaning liquids C described later) already reserved in a cleaning bath 7 or by spraying the one of the cleaning liquids C onto the workpiece W not immersed in the cleaning liquids C of the bath 7 from the cleaning tool T selected by turning a turret head 4.

In addition, here, the submerged cleaning is cleaning in a state of the workpiece W being completely immersed in the cleaning liquid C of the cleaning bath 7; the semi-submerged cleaning is cleaning in a state of the workpiece W being partially immersed in the cleaning liquid C of the cleaning bath 7; and the open-air cleaning is cleaning in a state of the workpiece W not being immersed in the cleaning liquid C of the cleaning bath 7.

The turret-type cleaning apparatus 1 comprises a jack stand 11, the cleaning tools T configured to spray the one of the cleaning liquids C (see FIG. 4) for deburring and/or cleaning the workpiece W, a turret device 2 configured to select one of the tools T, an XYZ-mechanism 12 configured to move the turret device 2 in an X-axis direction, a Y-axis direction, and a Z-axis direction, a cleaning chamber 3 where the workpiece W is configured to be cleaned, a cleaning liquid treatment device 13 configured to recover and regenerate the cleaning liquids C, a cleaning liquid circulation mechanism A (see FIG. 11) configured to circulate the one of the cleaning liquids C supplied to the tool T and the other of the cleaning liquids C supplied to the cleaning bath 7, a pallet 10 (see FIG. 3) configured to hold the workpiece W, a convey device 20 configured to convey the pallet 10 where the workpiece W is mounted, the bath 7 configured to temporary reserve the cleaning liquids C, the air blow device 38 configured to supply air for spraying it onto the workpiece W, a control device 36 (see FIG. 2) configured to control the apparatus 1, a power source (not shown), and an operation panel 37 (see FIG. 3) where switches such as a power source switch are arrayed.

<<Configuration of Jack Stand>>

As shown in FIG. 1, the jack stand 11 is a base configured to support from below the turret device 2, the cleaning chamber 3, the cleaning bath 7, a chute 34, and the like, and essentially consists of metallic skeleton members horizontally provided along a ground. At ends of an underside of the jack stand 11 are installed adjustable fittings respectively configured to horizontally adjust the stand 11.

<<Configuration of Cleaning Tools>>

As shown in FIG. 4, any one of the cleaning tools T is a water jet nozzle configured to spray the one of the cleaning liquids C therefrom and to remove a burr of the workpiece W; and a deburring tool configured to mechanically remove the burr by any of a brush, a drill, and the like, and in the tool T a control of a deburring and cleaning process is properly set, depending on a shape and the like of the workpiece W; and each of the tools T is freely rotatably and changeably attached to the turret head 4. Further specifically, various tools such as a lance nozzle, a flat spray nozzle, an L-type nozzle, a brush and the like are applicable to the cleaning tool T.

<<Configuration of Air Blow Device>>

As shown in FIG. 1, the air blow device 38 is an air spray device configured to blow off and remove the cleaning liquids C, and a chip adhered to the workpiece W, and comprises an air blow device 38 of an air supply source, an air blow supply pipe (not shown) whose base end is connected to the device 38, an air blow nozzle 38b connected to a top of the device 38, an air vent pipe 38c configured to discharge air containing moisture of an inside of the cleaning chamber 3, a mist collector 38d configured to purify the air sent from the pipe 38c and to discharge the air into an atmosphere, and a power source (not shown) for supplying electricity to the device 38. The air blow nozzle 38b (air ejection port) is different from the cleaning tools T and is separately installed at a bottom portion of the cleaning chamber 3 or the like. A check valve (not shown) is provided in the air blow pipe so that the cleaning liquids C reserved in the cleaning bath 7 does not enter in the pipe during the submerged cleaning.

<<Configuration of Turret Device>>

As shown in FIG. 1, the turret device 2 is a device configured to select the most suitable cleaning tool T from the plurality of the cleaning tools T mounted on the turret-type cleaning apparatus 1. The turret device 2 comprises a quill 21 arranged universally movably with respect to the jack stand 11, a center post 22 (see FIG. 7) fixed to the quill 21, the turret head 4 freely turnably supported at the post 22, a spindle drive device 5 configured to rotate the tools T, a turret drive device 6 configured to turn the head 4, and an NC (Numerical Control) control unit (not shown) for numerically controlling the turn of the head 4 and the rotation of the tools T.

<Configuration of Quill>

Figure 6:
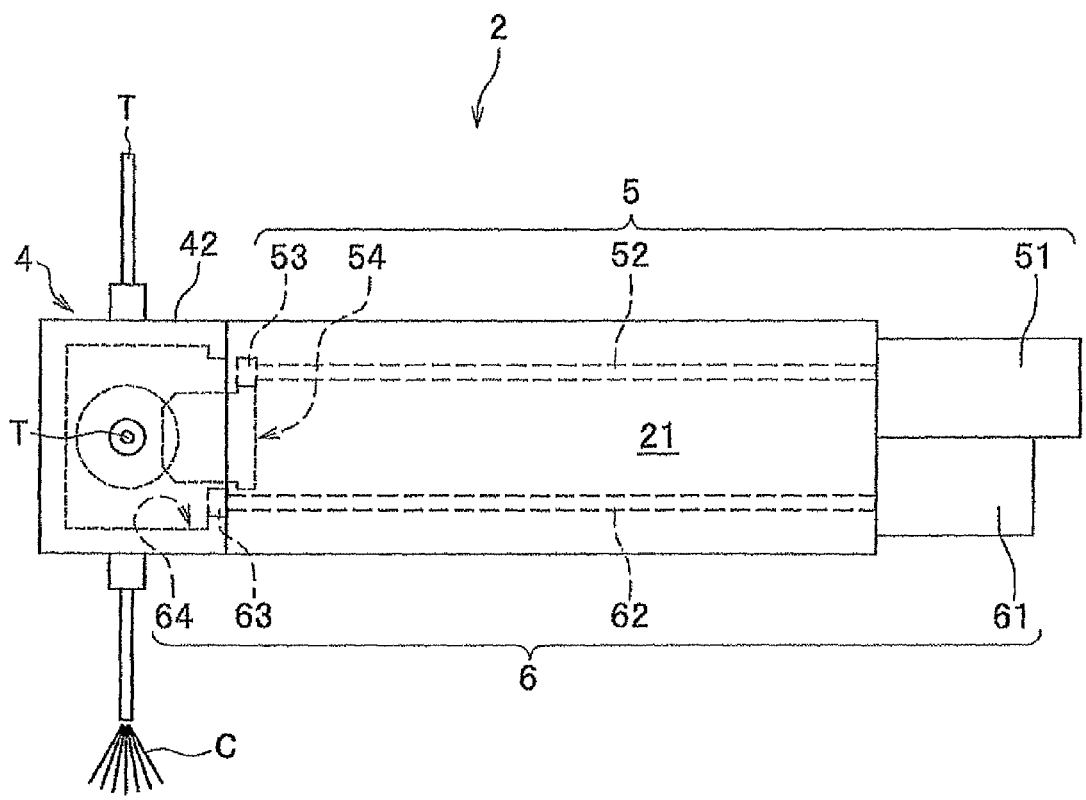
FIG. 6 is a main-portion vertical enlarged plan view showing a turret device of the turret-type cleaning apparatus according to the embodiment.

As shown in FIG. 6, the quill 21 is an approximately cylindrical member configured to rotatably support a main shaft region of a spindle reducer 54 and is arranged at a device main body (not shown) of the turret head 4 universally movably with respect to the jack stand 11.

<Configuration of Center Post>

Figure 7:
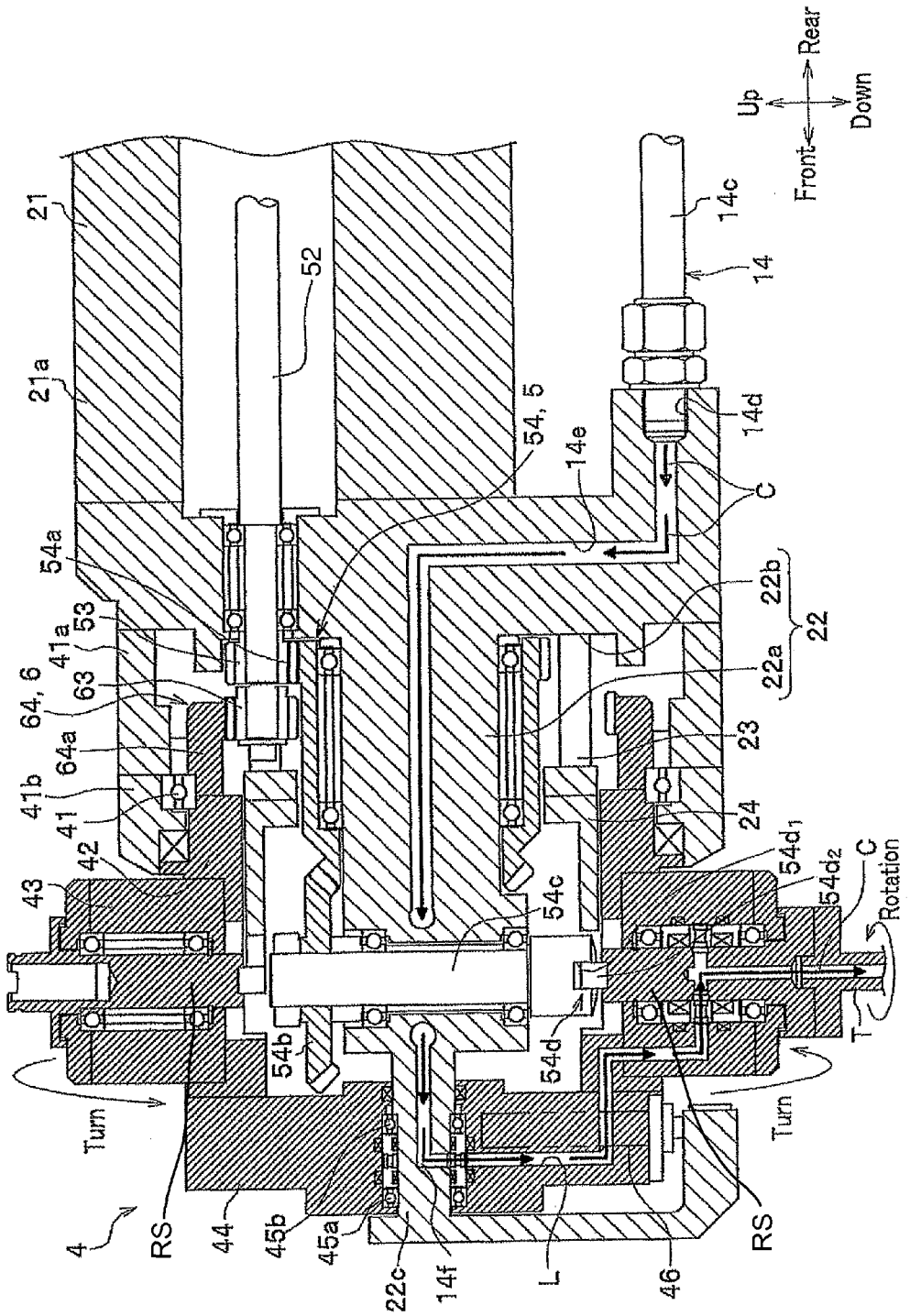
FIG. 7 is a main-portion enlarged section view showing a configuration of a turret head of the turret-type cleaning apparatus according to the embodiment.

As shown in FIG. 7, The center post 22 is a member configured to connect the quill 21 and a first cleaning liquid supply passage 14 to the turret head 4 and is interposed between the head 4, and the quill 21 and the passage 14. The center post 22 comprises a shaft portion 22a, and a flange portion 22b fixed to the quill 21. To a top of the shaft portion 22a is attached a rotary joint 22c. At the rotary joint 22c are arranged bearings 45a, 45b configured to universally rotatably support the top of the turret head 4. To the shaft portion 22a of the center post 22 is universally rotatably attached a spur gear 54a of an external gear described later.

Then a first guide ring 23 of a cylindrical shape makes an end face thereof abut with the flange portion 22b of the center post 22 and is fixed to the portion 22b so as to be positioned on an outside of the spur gear 54a, and further, a second guide ring 24 of a cylindrical shape is fixed to the ring 23. The second guide ring 24 plays a role of making an outer peripheral face thereof abut with an inner peripheral face of a turret head body 42 described later and universally turnably supporting the turret head 4.

Furthermore, to an edge of an outside in a radial direction of the flange portion 22b are fixed bearing pressers 41a, 41b of an approximately cylindrical shape so as to make end faces of thereof abut with the portion 22b, and an outer ring side of a bearing 41 is supported by the pressers 41a, 41b. An inner ring side of the bearing 41 is configured to universally rotatably support the turret head body 42 and an outer peripheral face of an internal gear 64a fixed thereto.

Thus, by supporting a rear end of the turret head 4 by means of the bearing 41 and the second guide ring 24 and by supporting the top of the head 4 at the bearings 45a, 45b of the rotary joint 22, the head 4 is freely turnably supported at the center post 22.

<Configuration of Turret Head>

As shown in FIG. 7, the turret head 4 is a device configured to turn and change the cleaning tools T and is freely turnably supported at the center post 22. The turret head 4 penetrates a shield device 35 (see FIG. 1) such as a splash pad and is universally movably arranged in the cleaning chamber 3. To the turret head 4 can be attached, for example, six cleaning tools T (only three shown) arranged at a same interval of the head 4 equally divided into six in a circumferential direction thereof, the head 4 can be used by turning downward one of the cleaning tools T used in cleaning the workpiece W.

As shown in FIG. 7, the turret head 4 comprises the turret head body 42 of a cylindrical shape, a tool support member 43 configured to freely rotatably support the cleaning tools T of a disc shape via cleaning tool rotary shafts RS, a change head body 44 where a flow passage L of the one of the cleaning liquids C is formed, and a change valve 46 for supplying or stopping the liquid C loaded in the body 44. As illustrated in FIG. 7, the cleaning tool rotary shafts RS are rotatably supported by the tool support members 43, and the cleaning tools T are attached to the cleaning tool rotary shafts RS, so that the cleaning tools T are rotatably supported by the tool support members 43.

To the turret head body 4 is fixed the internal gear 64a (described later) so as to be provided extendedly from a rear end of the body 42. The change valve 46 is configured, when a division of the turret head 4 is completed and the cleaning tool T comes to a position beneath as shown in FIG. 7, to push-open the valve 46 and make the flow passage L of the cleaning liquid C communicate, and to open a high pressure three-directional valve (not shown) at a timing when the liquid C is sprayed, and to supply the liquid C to the tool T.

<Configuration of Spindle Drive Device>

As shown in FIG. 6, the spindle drive device 5 is a drive device configured to rotate one of the cleaning tools T through the spindle reducer 54 from a spindle pinion 53 fitted outside a spindle drive shaft 52 coupled to a spindle motor 51.

Specifically, as shown in FIG. 7, the spindle reducer 54 comprises the spur gear 54a of an external gear engaging with the spindle pinion 53 at one end of the gear 54a, a bevel gear 54b engaging with the gear 54a at the other end thereof, a spindle shaft 54c freely rotatably supported at the rotary joint 22c coupled to the center post 22, and a joint device 54d coupling the shaft 54c and the cleaning tool T freely rotatably as one body via one of the cleaning tool rotary shafts RS. In particular, the joint device 54d is configured to couple one of the cleaning tool rotary shafts RS and the spindle shaft 54c. As such, the one of the cleaning tool rotary shafts RS that is coupled with the joint device 54d is configured to rotate together with the spindle shaft 54c.

Then it is configured that: the joint device 54d transmits a rotation of the spindle shaft 54c to the cleaning tool T by a key 54d2 fitted in a groove portion 54d1; the portion 54d1 and the key 54d2 are slid when the turret head 4 is turned; and thereby the head 4 is freely turnable.

<Configuration of Turret Drive Device>

As shown in FIG. 6, the turret drive device 6 is a drive device coupled to the turret head 4 and configured to turn the head 4. The turret drive device 6 turns the turret head 4 through a turret reducer 64 from a turn pinion 63 fitted outside a turn drive shaft 62 coupled to a turret turn motor 61.

Specifically, as shown in FIG. 7, with respect to the turret reducer 64, the turret head body 42 is coupled to one end of the internal gear 64a engaged with the turn pinion 63 at the other end of the gear 64a; thereby the body 42 is adapted to turn with respect to the shaft 22a of the center post 22.

Here, as shown in FIG. 6, the spindle drive shaft 52 coupled to the spindle motor 51 and the turn drive shaft 62 coupled to the turret turn motor 61 are provided at the quill 21 so as to be parallel at a same height in a horizontal direction.

According to the configuration thus described, because the turret-type cleaning apparatus 1 can be compact and achieve weight-saving in its drive system, it is possible to arrange the spindle motor 51 and the turret turn motor 61 outside the cleaning chamber 3. Then by arranging the spindle motor 51 and the turret turn motor 61 outside the cleaning chamber 3, it is prevented in the turret-type cleaning apparatus 1 that motor lives of the motors 51, 61 are shortened by the cleaning liquid C entering into the motors 51, 61 and that a trouble easily occurs; thereby a durability and reliability of the apparatus 1 are enhanced.

<<Configuration of XYZ Mechanism>>

As shown in FIG. 1, the XYZ mechanism 12 is a moving device configured to linearly move the turret head 4 in an up-and-down direction, a front-and-rear direction, and a left-and-right direction. The XYZ mechanism 12 comprises an X-axis moving mechanism configured to move the head 4 in an X-axis (left-and-right) direction, a Y-axis moving mechanism configured to move the head 4 in a Y-axis (front-and-rear) direction, and a Z-axis moving mechanism configured to move the head 4 in a Z-axis (up-and-down) direction.

<<Configuration of Cleaning Chamber>>

As shown in FIG. 1, the cleaning chamber 3 is a cleaning space where the workpiece W (see FIG. 4) is cleaned and deburred. In the cleaning chamber 3 are arranged the turret head 4, the cleaning bath 7, the pallet 10, a turn unit 8 (see FIG. 3), the workpiece W, and the like.

Figure 2:
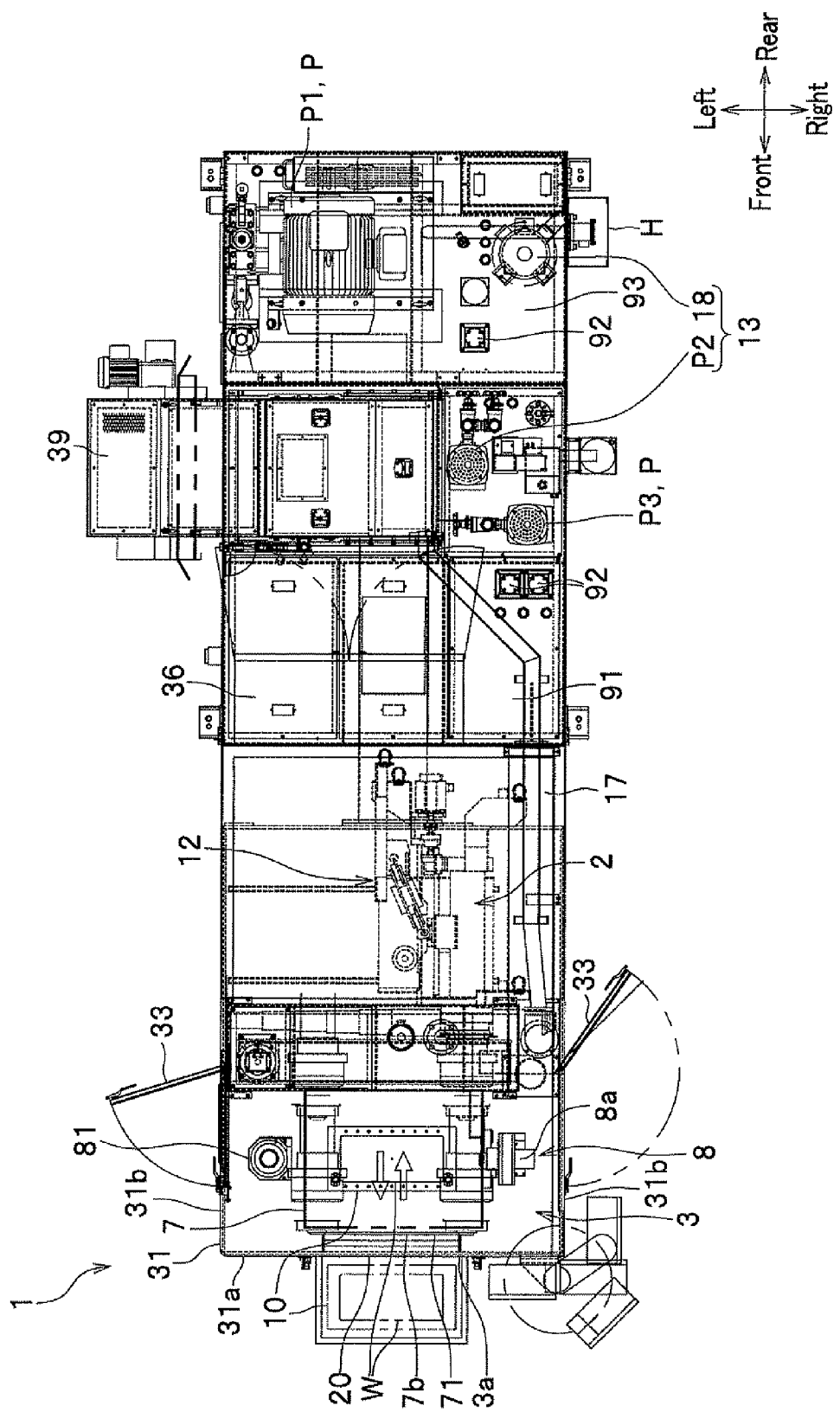
FIG. 2 is a plan view showing the turret-type cleaning apparatus according to the embodiment.

As shown in FIG. 2, the cleaning chamber 3 is surrounded by a cover member 31 forming a peripheral wall portion of the chamber 3, and a cover member 31a forming a sidewall on a front side of the chamber 3 and is mainly formed of a cleaning chamber carrying-in-and-out port 3a configured to carry in the workpiece W inside the chamber 3; slide doors 32 (first opening and closing body) configured to open and close the port 3a and linearly move; and one-side opening doors 33 (second opening and closing body) arranged respectively at cover members 31b forming sidewalls of both side faces of the chamber 3.

As shown in FIG. 9A, the cover member 31a, where the slide doors 32 are arranged, comprises fixation seal members 32a of a wedge shape having slopes 32b. The slide doors 32 respectively comprise door seal members 32c of a wedge shape having slopes 32d.

Then the slopes 32d of the door seal members 32c are formed to be inclined so that rear end sides of the slopes 32d are more adjacent to the fixation seal members 32a than top end sides thereof with respect to a proceed direction of closing the slide doors 32; the slopes 32b of the fixation seal members 32a are formed in parallel corresponding to the slopes 32d of the members 32c and are inclined so that center portions of the members 32a are more adjacent to the seal members 32c than both sides thereof.

Therefore, as shown in FIG. 9B, because the door seal members 32c and the fixation seal members 32a contact with each other, it is possible to prevent the cleaning liquids C and a sound in cleaning from leaking outside by enhancing air-tightness of the cleaning chamber 3. Accordingly, the turret-type cleaning apparatus 1 provided with the slide doors 32 having high air-tightness above described can ensure a good operation environment.

Figure 10A:
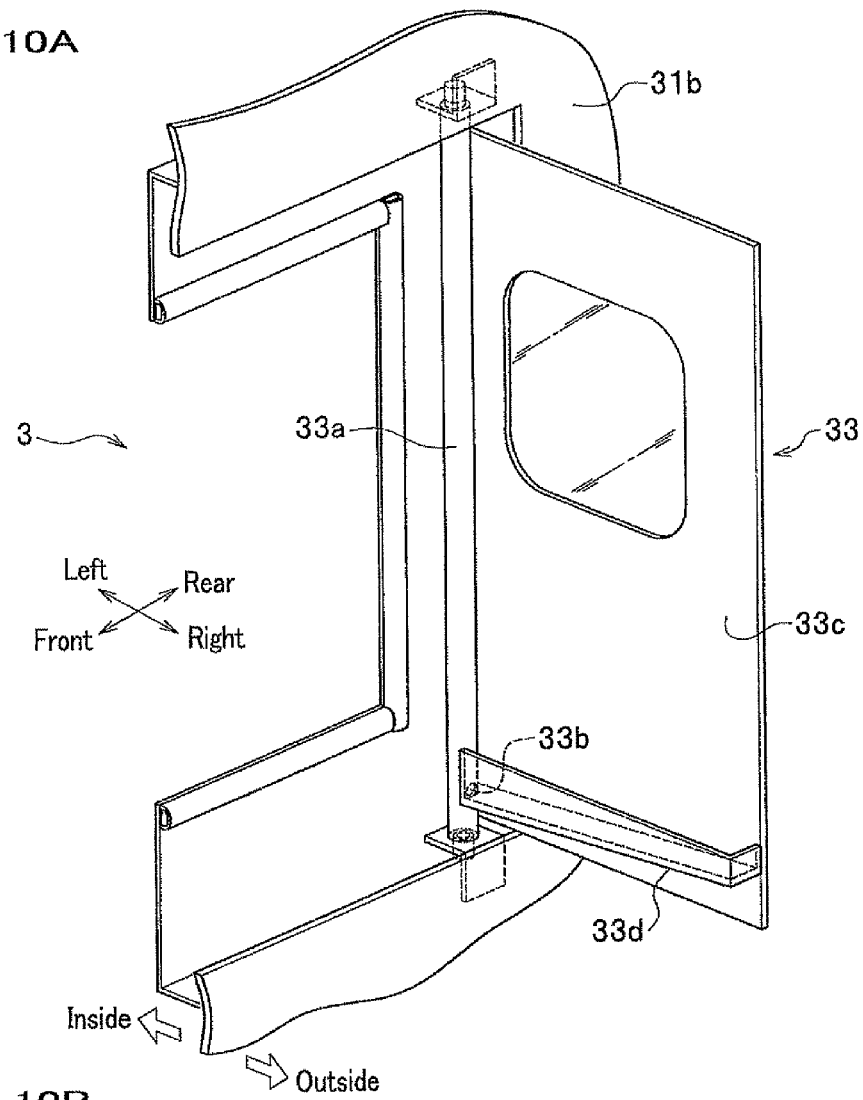
FIGS. 10A, 10B, and 10C show a configuration of a one-direction opening door.
Figure 10B:
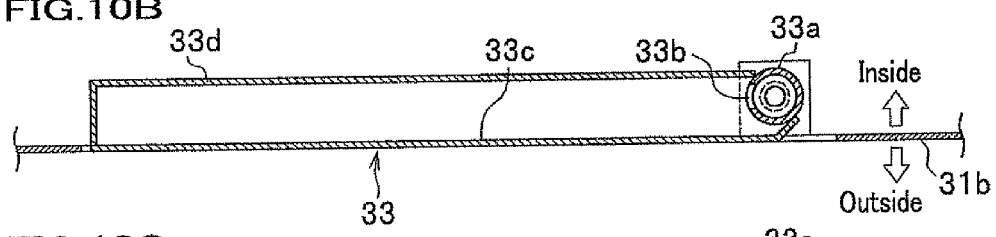
Figure 10C:
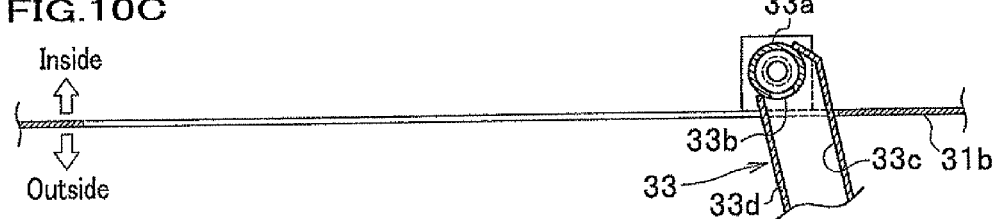

Furthermore, as shown in FIGS. 10A, 10B, and 10C, the cleaning chamber 3 comprises the cover member 31b of a side face of a housing, and the one-side opening door 33 configured to turn around a hinge portion 33a arranged at the member 31b with making the portion 33a a center of the turning.

The one-side opening door 33 turns around the hinge portion 33a arranged at the cover member 31b with making the portion 33a the center of the turning, and a cleaning liquid recovery hole 33b is provided at a lower portion of the portion 33a. On one hand, on an inner wall face 33c of the one-side opening door 33 is provided a trough 33d arranged so that a height thereof becomes lower as the trough 33d approaches to the hinge portion 33a from a far edge therefrom.

According to the configuration thus described, the cleaning liquids C running down and dropping via the inner wall face 33c is adapted to be received by the trough 33d, to be dropped inside the cleaning chamber 3 from the cleaning liquid recovery hole 33b, and to be recovered from the chute 34 (see FIG. 1).

Accordingly, because the turret-type cleaning apparatus 1 provided with the one-side opening doors 33 thus described can effectively prevent the cleaning liquids C adhered to each inner wall face 33c of the doors 33 from dropping on a floor outside when the doors 33 are opened, it is possible to ensure a good work environment.

<<Configuration of Pallet>>

As shown in FIG. 2, the pallet 10 is a hold device configured to hold the workpiece W and is adapted to be slidingly moved from an outside of the turret-type cleaning apparatus 1 across the cleaning chamber 3 and an inside of the cleaning bath 7 and to be carried in and out in a state of mounting the workpiece W.

<<Configuration of Turn Unit>>

As shown in FIGS. 3 and 4, the turn unit 8 is a unit configured to adjust a direction of the workpiece W with respect to the cleaning tool T by turning the pallet 10 where the workpiece W is mounted. The turn unit 8 comprises a turn drive device 81 configured to indirectly turn the workpiece W through the pallet 10, and a tail stock portion 8a; and is arranged outside the cleaning bath 7.

In addition, the turn unit 8 may also be a type of a turn unit having a tilt table; that is, the unit 8 may be a unit provided with a new turn drive device of the cleaning chamber 3 and having an auto function of capable of rotating, going up and down, and horizontally moving.

<<Configuration of Convey Device>>

As shown in FIGS. 1 and 2, the convey device 20 is a device configured to convey the pallet 10, where the workpiece W is mounted, from a cleaning bath carrying-in-and-out port 7b to the turn unit 8 in the cleaning bath 7 through the cleaning chamber carrying-in-and-out port 3a; and to return the pallet 10 on the unit 8 to an outside of the cleaning chamber 3 together with the workpiece W. In the embodiment, as an example of the convey device 20, a case of carrying-in-and-out being performed by a manual device through a manual work will be described. The convey device 20 is a device including, for example, a roller and the like arranged between the device 20 and the pallet 10.

<<Configuration of Cleaning Liquid Circulation Mechanism>>

Figure 11:
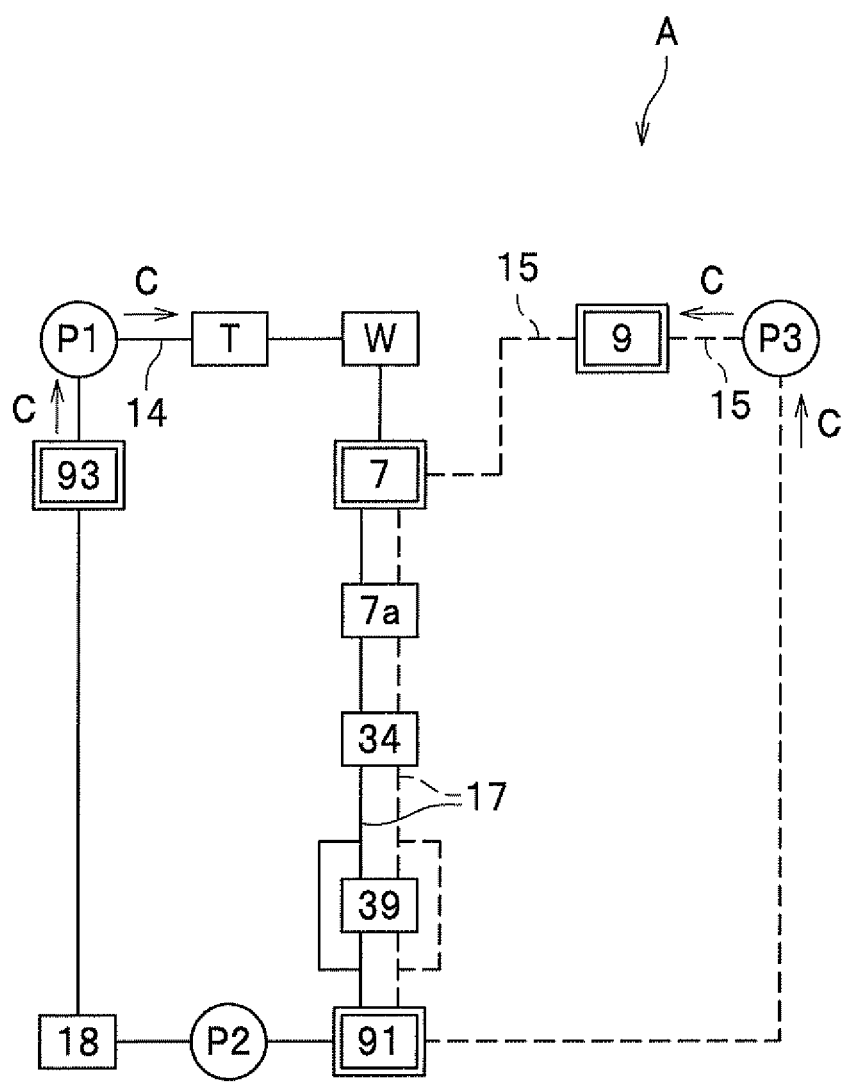
FIG. 11 is a circulation diagram showing two circulation loops of cleaning liquids in a cleaning liquid circulation mechanism according to the embodiment.

As shown in FIGS. 4 and 11, a cleaning liquid circulation mechanism A is a device configured to drain the cleaning liquids C from a drain port 7a of the cleaning bath 7, to purify and regenerate the liquids C, and then to circulate the liquids C so as to be again supplied separately to the cleaning tool T and the bath 7, wherein the one of the cleaning liquids C is sprayed from the tool T, dropped below a floor of the cleaning chamber 3, and recovered therefrom, and wherein the other of cleaning liquids C not via the tool T is used for cleaning the workpiece W therein in the bath 7.

As shown in FIGS. 1 and 11, the cleaning liquid circulation mechanism A comprises: the cleaning liquid treatment device 13 configured to be able to reuse the cleaning liquids C used in cleaning the workpiece W; the first cleaning liquid supply flow passage 14 configured to supply the one of the liquids C to the tool T; the second cleaning liquid supply flow passage 15 configured to supply the other of cleaning liquids C to the cleaning bath 7; cleaning liquid supply source P (consisting of pumps P1 and P3 described later) configured to supply the liquids C to the first and second cleaning liquid supply flow passage 14, 15, respectively; a cleaning liquid supply tank 9 configured to temporary reserve the other of the cleaning liquids C from the passage 15; the bath 7 whose upper portion is open and where the drain port 7a is provided at a bottom portion of the bath 7; the chute 34 configured to send a drainage (cleaning liquids C) drained from the port 7a to a drain flow passage 17; the passage 17 configured to drain the liquids C outside the cleaning chamber 3; a with-chip-conveyor rotary filter 39 (see FIG. 2) configured to remove a chip and the like from the liquids C after cleaning the workpiece W; a primary tank (dirty tank) 91 configured to temporary reserve the liquids C drained; a secondary tank (clean tank) 93 configured to reserve one of the liquids C after the one of the liquids C in the primary tank 91 are filtrated by the cleaning liquid treatment device 13; and liquid-surface-height detection devices 92 configured to detect liquid surfaces of the liquids C in the primary tank 91 and the one of the liquids C in the secondary tank 93.

<Configuration of Cleaning Liquid Treatment Device>

The cleaning liquid treatment device 13 is a device configured to regenerate the one of the cleaning liquids C already used for cleaning the workpiece W and to make the cleaning liquid C reusable for spraying the liquid C from the cleaning tool T and cleaning the workpiece W. The cleaning liquid treatment device 13 comprises a filter pump P2 for drawing the one of the cleaning liquids C in the primary tank 91 and a cleaning liquid treatment filter 18 (filtration device) configured to filtrate the cleaning liquid C.

The filter pump P2 is a pump configured to draw the one of the used cleaning liquids C in the primary tank 91 and to send out the liquid C to the cleaning liquid treatment filter 18 and is installed on the tank 91.

The cleaning liquid treatment filter 18 is a filter configured to purify and regenerate the used cleaning liquid C drawn up by the filter pump P2 from the primary tank 91. The cleaning liquid treatment filter 18 is changeably installed at a plurality of appropriate places of the cleaning liquid treatment device 13.

<Configuration of First Cleaning Liquid Supply Flow Passage>

As shown in FIG. 1, the first cleaning liquid supply flow passage 14 is a supply passage configured to supply the one of the cleaning liquids C to the cleaning tool T. As shown in FIG. 1, the first cleaning liquid supply flow passage 14 is formed so as to communicate from a high pressure pump P1 to the cleaning tool T of the turret head 4 and comprises: a high pressure hose 14a connected from the high pressure pump P1 to a cleaning liquid supply port 14b arranged outside the cleaning chamber 3; a supply pipe 14c connected from the port 14b and a joint 14d of the head 4; a flow passage 14e formed inside the center post 22; a flow passage 14f connected from the passage 14e to the rotary joint 22c; and a flow passage L formed inside the change head body 44 configured to connect the passage 14f and the tool T.

Figure 8:
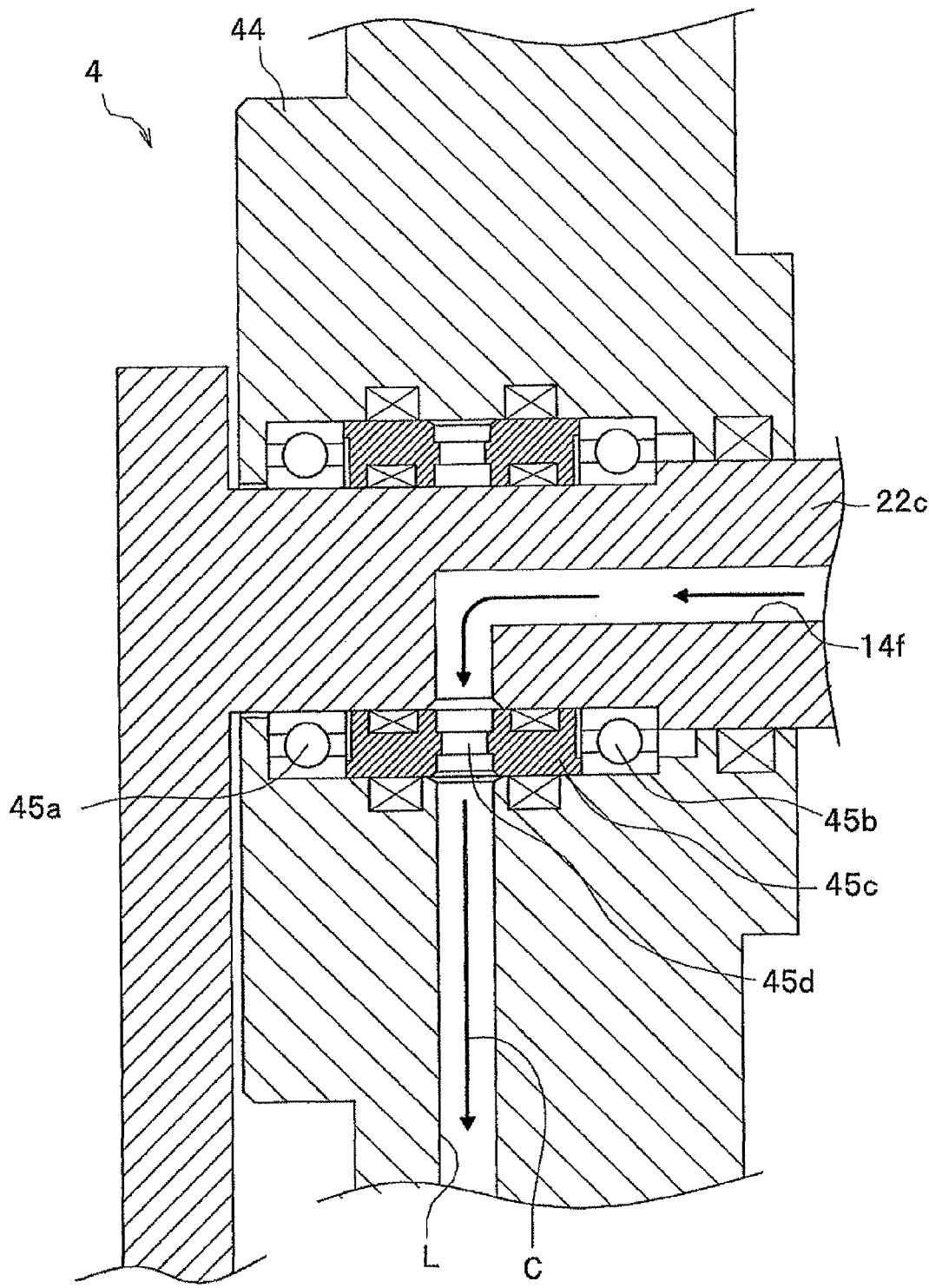
FIG. 8 is a main-portion enlarged section view of the turret head showing a configuration of a rotary joint.

Here, as shown in FIG. 8, the rotary joint 22c plays a role of supplying the one of the cleaning liquids C from the fixed center post 22 to the cleaning tool T attached to the rotating turret head 4.

Specifically, it is configured that a cylindrical shape spacer ring 45c is fitted between the bearings 45a, 45b arranged on an outer periphery of the rotary joint 22c, and that the cleaning liquid C passes through an introduction through-hole 45d formed in the ring 45c and communicates from the flow passage 14f to the flow passage L.

According to the configuration thus described, because it is unnecessary to arrange the high pressure hose 14a in the cleaning chamber 3, it is possible to avoid the hose 14a from being damaged and to enlarge a movement range thereof by making the head 4 smoothly movable. Furthermore, because the high pressure hose 14a of the first cleaning liquid supply flow passage 14 is connected to a base end of the center post 22, is provided inside the turret head 4, and is not in a state of being exposed in the chamber 3, the hose 14a does not be twisted in connection with the rotation of the head 4 and the like and is not deteriorated across ages. Moreover, the first cleaning liquid supply flow passage 14 does not also restrict the movement range of the turret head 4.

<Configuration of Second Cleaning Liquid Supply Flow Passage>

As shown in FIG. 1, the second cleaning liquid supply flow passage 15 is a flow passage configured to supply the other of the cleaning liquids C filtrated by the rotary filter 39 and reserved in the primary tank 91. The second cleaning liquid supply flow passage 15 is extended from a liquid-supply-tank supply pump P3 to a side of the cleaning bath 7 through the cleaning liquid supply tank 9 and is arranged so as to be able to supply the purified cleaning liquid C (the other of the cleaning liquids C) to the bath 7.

<Configuration of Cleaning Liquid Supply Source>

As shown in FIG. 1, the cleaning liquid supply source P comprises two pumps: the high pressure pump P1 configured to send the one of the cleaning liquids C to the cleaning tool T and the liquid-supply-tank supply pump P3 configured to send the other of the cleaning liquids C to the cleaning liquid supply tank 9.

The high pressure pump P1 is a pump for supplying the one of the cleaning liquids C to the cleaning tool T through the first cleaning liquid supply flow passage 14 and the turret head 4 in a state of pressurizing the liquid C, for example, to about 50 MPa and is installed on the secondary tank 93.

The liquid-supply-tank supply pump P3 is a cleaning liquid supply source for supplying the cleaning liquid C to the cleaning liquid supply tank 9 and is installed on an upper portion of the primary tank 91.

<Configuration of Supply Tank>

As shown in FIG. 4, the cleaning liquid supply tank 9 is a reserve bath configured to temporary reserve the other of the cleaning liquids C existing in the second cleaning liquid supply flow passage 15 and is connected thereto through a for-cleaning-liquid open and close valve V1 (see FIG. 4). The cleaning liquid supply tank 9 is arranged at a roof of the cleaning chamber 3 positioned to be higher than the cleaning bath 7 and is adapted to be able to supply the other of the cleaning liquids C through a pipe PP by opening the for-cleaning-liquid open and close valve V1 and also by a potential energy. The pipe PP lengthens downward from a bottom of the cleaning liquid supply tank 9 and is connected with the second cleaning liquid supply flow passage 15. The for-cleaning-liquid open and close valve V1 is disposed at a bottom of the pipe PP. Furthermore, the cleaning liquid supply tank 9 is installed at a roof region of a structure body forming the cleaning chamber 3, and thereby, it is possible to make a whole of the turret-type cleaning apparatus 1 a small size and to save a space thereof.

Moreover, to the cleaning liquid supply tank 9 is attached a sensor 9a for detecting a liquid volume in the tank 9, and by controlling the volume therein, it is possible to open the for-cleaning-liquid open and close valve V1 (flow volume adjustment device) and to adjust a supply volume of the other of the cleaning liquids C supplied to the cleaning bath 7. In addition, by filling the cleaning liquid supply tank 9 with a definite volume of the cleaning liquid C, the for-cleaning-liquid open and close valve V1 may also be configured to be a flow volume adjustment device so that the supply volume of the cleaning liquid C to the cleaning tank 7 can be adjusted by opening and closing the valve V1.

<<Configuration of Cleaning Bath>>

Figure 5:
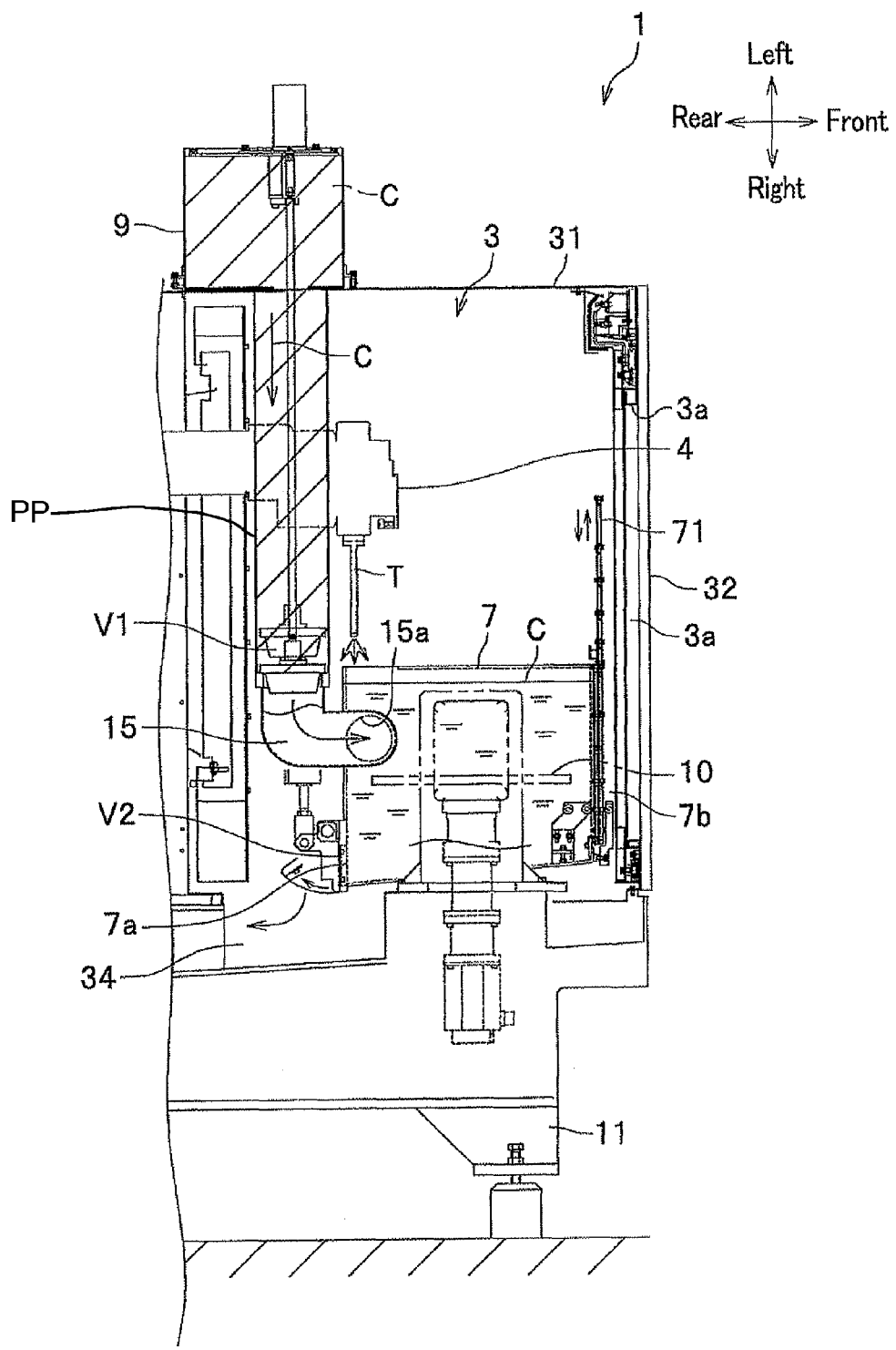
FIG. 5 is a schematic perspective view seen from a right side of the turret-type cleaning apparatus and showing the cleaning chamber of the apparatus according to the embodiment.

As shown in FIG. 5, the cleaning bath 7 is a bath configured to temporary reserve: the other of the cleaning liquids C supplied by opening the for-cleaning-liquid open and close valve V1 and the one of the cleaning liquids C sprayed from the cleaning tool T and dropped in the bath 7, and the bath 7 is installed in the cleaning chamber 3 where the turret head 4 is arranged. The drain port 7a is arranged at a lower portion of the bath 7 and openable and closable for draining the cleaning liquids C in the bath 7; the cleaning bath carrying-in-and-out port 7b formed on a side face of the bath 7 and for carrying the workpiece W therein; and a shutter 71 (second opening and closing body) configured to open and close the port 7b.

The drain port 7a is adapted to be able to appropriately adjust a drain flow volume of the cleaning liquids C in the cleaning bath 7 by remotely operating a control switch (not shown) installed at the operation panel 37 and by opening and closing a drain valve V2 (flow volume adjustment device) configured to be able to open and close an opening hole formed at a bottom portion of the bath 7.

In addition, with respect to the drain port 7a, a drain timing thereof is adapted to be able to be changed, wherein in the timing are considered such a cleaning time and a cleaning pattern (process) configured with the submerged cleaning, the semi-submerged cleaning, the open-air cleaning, and the like. Furthermore, by an energizing force in connection with draining from the port 7a, the cleaning liquids C reserved in the cleaning bath 7, a chip and the like adhered to the workpiece W are adapted to be easily eliminated.

As shown in FIG. 5, the cleaning bath carrying-in-and-out port 7b is formed across an approximate whole-side-face portion of the cleaning bath 7 on a side of the cleaning chamber carrying-in-and-out port 3a.

The shutter 71 is universally extendably and contractably installed upward from a lower end of the cleaning bath carrying-in-and-out port 7b, and it is possible to open and close the port 7b by gripping, pulling up, and pushing down the shutter 71 by hand; the shutter 71 may also be configured to be automatically opened and closed by operating through the operation panel 37. The shutter 71 can prevent the cleaning liquid C sprayed from the cleaning tool T from spattering on each of the slide doors 32 by being pulled up higher than a height of the cleaning bath 7.

<Configuration of Chute and Drain Flow Passage>

As shown in FIG. 1, the chute 34 is a piping for sending a drainage (cleaning liquids C) drained from the drain port 7a (see FIG. 5) at a lower portion of the cleaning bath 7 toward the drain flow passage 17 and is formed so as to obliquely go down.

The drain flow passage 17 is a flow passage configured to drain the cleaning liquids C, which contains a chip discharged and overflowed from the cleaning bath 7, from the cleaning chamber 3, and to send the liquids C to the primary tank 91 together with the chip. With respect to the drain flow passage 17, an upstream side thereof is connected to the chute 34, a downstream side thereof is connected to an upper portion of the primary tank 91 through the rotary filter 39, and a whole of the passage 17 is obliquely arranged.

<Configuration of Primary Tank>

The primary tank 91 is a tank configured to temporary reserve the used cleaning liquids C (drainage) sent through the drain flow passage 17 Although a large chip and the like are removed by the rotary filter 39, the cleaning liquids C reserved in the primary tank 91 is in a state of a burr of the workpiece W, and a small chip and the like adhered thereto being mixed in the liquids C. Furthermore, in the primary tank 91 is installed an oil skimmer (not shown) for removing cutting oil floating on a liquid surface of the cleaning liquids C, lubrication oil from a slide portion, and the like.

<Configuration of Secondary Tank>

The secondary tank 93 is a tank for reserving one of the cleaning liquids C filtrated by the cleaning liquid treatment device 13. The cleaning liquid C reserved in the secondary tank 93 is sent to the cleaning tool T from the first cleaning liquid supply passage 14 by the high pressure pump P1.

Furthermore, the secondary tank 93 comprises a heater H for heating the cleaning liquid C. The heater H is a heater for heating the cleaning liquid C to an appropriate temperature (for example, 50 degrees Celsius). Furthermore, the heater H may be provided at the primary tank 91 as needed, and at both of the tank 91 and the secondary tank 93.

<Configuration of Liquid-Surface-Height Detection Device>

As shown in FIG. 1, the liquid-surface-height detection devices 92 are controllers installed in the primary tank 91 and the secondary tank 93, respectively, and configured to detect a liquid surface of the cleaning liquid(s) C reserved in each of the tanks 91 and 93 and to adjust a liquid volume of each of the tanks 91 and 93. The liquid-surface-height detection devices 92 are adapted to be electrically connected to the high pressure pump P1 and the filter pump P2; depending on liquid-surface-heights of the cleaning liquids C in the primary tank 91 and the secondary tank 93, the pumps P1 and P2 are adapted to be driven, respectively. Furthermore, when the liquid volume in the primary tank 91 is little, a new cleaning liquid is supplied through a supply device not shown.

<Configuration of With-Chip-Conveyor Rotary Filter >

The with-chip-conveyor rotary filter 39 is a filter configured to separate the used cleaning liquids C containing a chip into cleaning liquids C and the chip and to filter the separated cleaning liquids C. The with-chip-conveyor rotary filter 39 comprises, for example, a rotary filter consisting of a cylindrical screen (not shown) for separating the chip mixed in the used cleaning liquids C, a conveyor chain (not shown) for rotationally driving the rotary filter, and a drive motor (not shown) for driving the conveyor chain.

In addition, it is not always necessary to provide the rotary filter 39, and the cleaning liquids C reserved in the primary tank 91 may be supplied to cleaning bath 7.

<<Configuration of Control Device and Operation Panel>>

As shown in FIG. 2, the control device 36 is a controller configured to control devices driven by electricity in the turret-type cleaning apparatus 1 and is arranged at a center portion of the turret-type cleaning apparatus 1 in plan view. In short, the device 36 is a device configured to control the turret device 2, the turn unit 8, the liquid-surface-height detection devices 92, the XYZ mechanism 12, the air blow device 38, and the cleaning liquid circulation mechanism A.

As shown in FIG. 3, the operation panel 37 is a switch operation panel where a plurality of switches such as a power source switch and the like are arrayed and is installed at an outer wall of the cleaning chamber 3 near the slide door 32.

<<Action>>

Operations of the turret-type cleaning apparatus 1 of the embodiment thus configured will be described.

Firstly, as shown in FIG. 2, the workpiece W is set on the pallet 10. Next, the workpiece W together with the pallet 10 is conveyed to the cleaning chamber 3 by the convey device 20 and is pushed in the cleaning bath 7.

Subsequently, an activation button (not shown) of the turret-type cleaning apparatus 1 is operated by pushing the button, wherein the button is arranged on an outer side of the cleaning chamber 3. Then the slide doors 32 of the cleaning chamber 3 are closed. Then the shutter 71 of the cleaning bath 7 descends and is closed. Finally, the pallet 10 is clamped. The operations thus described are automatically performed only by pushing the activation button. Naturally, each of the operations can be manually performed one by one.

Then, by opening the for-cleaning-liquid open and close valve V1, the other of the cleaning liquids C reserved in the cleaning liquid supply tank 9 existing at the roof of the cleaning chamber 3 is supplied to the cleaning bath 7. Even after a completion of supplying the liquid C, it is intermittently supplied to the cleaning liquid supply tank 9 by the liquid-supply-tank supply pump P3, and thereby, a preparation for a next cleaning cycle is made.

With respect to the turret-type cleaning apparatus 1, in case of rotating the cleaning tool T, the spindle motor 51 is driven, thereby this driving force is transmitted from the spindle drive shaft 52, through the spindle pinion 53, to the spur gear 54a of an external gear and to the bevel gear 54b, thereby the spindle shaft 54c is rotated, and the tool T is rotated through the joint device 54d.

Furthermore, with respect to the turret-type cleaning apparatus 1, in case of turning the turret head 4 and selecting the cleaning tool T as shown in FIG. 7, the turret turn motor 61 is driven, thereby this driving force is transmitted to the internal gear 64a and the turret head body 42 through the turn pinion 63 from the turn drive shaft 62, and thereby the turret head 4 is turned as shown in FIG. 6. The turret head 4 can move the cleaning tool T to a desired position by moving the tool T in the X-axis direction, the Y-axis direction, and the Z-axis direction. Furthermore, as shown in FIG. 4, by turning the turn unit 8, a direction of the workpiece W with respect to the cleaning tool T can be adjusted.

Thus with respect to the turret-type cleaning apparatus 1, it is possible to spray the one of the cleaning liquids C onto cylinders Wa and the like of the workpiece W and to deburr and/or clean the cylinders Wa and the like, while rotating the cleaning tool T of a brush, a spray nozzle, and the like selected by turning the turret head 4.

In case of NC-cleaning the workpiece W, firstly, the cleaning liquid C of a hydraulic pressure of about 7 MPa is sprayed onto the workpiece W immersed in the cleaning liquids C in the cleaning bath 7, and thereby the submerged cleaning is performed. In cleaning the workpiece W, by cleaning it in the cleaning liquids C of the cleaning bath 7, it is possible to suppress a cleaning sound to be equal to or less than 80 dB. After the cleaning, the cleaning liquids C in the cleaning bath 7 are drained from the drain port 7a (see FIG. 5).

The cleaning liquids C drained are sent to the primary tank 91 through the drain flow passage 17 and are used by circulation.

Next, the turret head 4 is turned, and thereby the cleaning tool T is changed from another cleaning tool T for the submerged cleaning to another tool T for the open-air cleaning. Then in a state of the workpiece W not being immersed, the open-air cleaning is performed by spraying one of the cleaning liquids C of a hydraulic pressure of about 35 MPa onto the workpiece W from the cleaning tool T for the open-air cleaning.

Subsequently, the turn unit 8 is driven; thereby the workpiece W is turned so that cleaned places and a portion, where a chip is adhered, in the cylinders Wa and the like of the workpiece W are directed toward the air blow device 38 (see FIG. 1); and compressed air is blown to the workpiece W by the air blow nozzle 38b. With respect to a work of removing matters adhered to the workpiece W, it is possible to efficiently blow away the matters by striking air blown from the air blow nozzle 38b of the air blow device 38 at the workpiece W, while changing a direction of the nozzle 38b by swing it by the turn unit 8.

Next, the clamp of the pallet 10 is released, the shutter 71 of the cleaning bath 7 is made to go up, and thereby the slide doors 32 of the cleaning chamber 3 are opened. Then a worker pulls out the pallet 10 from the inside of the cleaning chamber 3, the workpiece W is unfastened from the pallet 10, and thus the cleaning work of the workpiece W is completed.

As thus described, according to the turret-type cleaning apparatus 1 of the present invention, it is possible to select any cleaning tool T suitable for cleaning the workpiece W out of various cleaning tools T and to surely deburr and/or clean the workpiece W by the submerged cleaning, the semi-submerged cleaning, the open-air cleaning, and the air blow device 38 by nothing but the apparatus 1.

In addition, according to the turret-type cleaning apparatus 1, drive sources such as the spindle motor 51, the turret turn motor 61, and a motor 81a of the turn drive device 81, and the high pressure hose 14a for supplying the cleaning liquid C of a high pressure are arranged outside the cleaning chamber 3; thereby in cleaning the workpiece W, the drive sources are not wetted with the cleaning liquid C, and the hose 14a is not twisted. Therefore, the turret-type cleaning apparatus 1 can prevent a deterioration of the high pressure hose 14a and a trouble of the apparatus 1, and the movement range of the turret head 4 also is not restricted by the hose 14a; thus the apparatus 1 is a cleaning apparatus easily performing the cleaning work.

<<Modification Examples>>

In addition, the present invention is not limited to the embodiment, can be modified and changed within the spirit and scope of the invention, and it goes without saying that the invention also covers the modified and changed inventions.

If the convey device 20 described in the embodiment can convey the pallet 10 where the workpiece W is mounted, a type and the like of the device 20 are not specifically limited. The convey device 20 may comprise arm portions such as a loader outside the device 20 and also be a slide-type automatic convey device.

The convey device 20 may also be any one of such a crane, an arm-type convey robot, and a pallet changer capable of moving the pallet 10 in the up-and-down direction (Z-axis direction), the front-and-rear direction (Y-axis direction), and the left-and-right direction (X-axis direction). Otherwise, the convey device 20 may also be a convey device comprising a system movable in the up-and-down direction, the front-and-rear direction, and the left-and-right direction; and turnable in the front-and-rear direction and the left-and-right direction.

The shutter 71 provided at the cleaning bath 7 may be something that can open and close the cleaning bath carrying-in-and-out port 7b and be, for example, a slide door configured to slide in the horizontal direction or the up-and-down direction.

Furthermore, the cleaning liquids C may contain a detergent; the one of the cleaning liquids C sprayed from the cleaning tool T is not limited to a high pressure cleaning liquid and may be mixed with ice and be sprayed onto the workpiece W. If thus configured, it is possible to enhance the deburring function of the cleaning tool T.

What is claimed is:

1. A turret-type cleaning apparatus, comprising:
a center post fixed to one end of a quill, the quill disposed movably with respect to a jack stand, the center post having a shaft portion;
a turret head turnably supported by the center post and capable of turning around the shaft portion;
a spindle shaft rotatably supported by the shaft portion of the center post;
a spindle drive device having a spindle motor arranged at the other end of the quill, a spindle drive shaft coupled to the spindle motor, a spindle pinion fitted outside the spindle drive shaft, and an external gear engaged with the spindle pinion at one end of the external gear and engaged with a bevel gear attached to the spindle shaft at the other end of the external gear, the external gear being rotatably supported on the shaft portion of the center post;
tool support members disposed in the turret head;
cleaning tool rotary shafts rotatably supported by the tool support members,;
cleaning tools attached to the cleaning tool rotary shafts, one of the cleaning tools spraying a cleaning liquid onto a workpiece to deburr and/or clean the workpiece;
a joint device configured to selectively couple one of the cleaning tool rotary shafts and the spindle shaft, the joint device having a groove portion and a plurality of keys, the groove portion being formed at one end portion of the spindle shaft, the plurality of keys being attached to respective ends of the cleaning tool rotary shafts, one of the plurality of keys being fitted in the groove portion and configured to slide out of the groove portion when the turret head is turned so that the one of the plurality of keys and the groove portion are not aligned;
a turret drive device having a turret turn motor arranged at the other end of the quill, a turn drive shaft coupled to the turret turn motor, a turn pinion fitted outside the turn drive shaft, an internal gear coupled to the turret head, the internal gear being engaged with the turn pinion and being positioned outside the external gear;
a cleaning chamber in which the turret head is disposed;
a cleaning bath installed in the cleaning chamber to reserve the cleaning liquid;
a first cleaning liquid supply flow passage to supply the cleaning liquid to the cleaning tool;
a second cleaning liquid supply flow passage to supply the cleaning liquid to the cleaning bath;
a cleaning liquid supply source configured to supply the cleaning liquid to the first cleaning liquid supply flow passage and the second cleaning liquid supply flow passage; and
a drain port configured to selectively open and close, disposed at a lower portion of the cleaning bath, and configured to drain the cleaning liquid in the cleaning bath,
wherein the one of the cleaning tool rotary shafts coupled with the joint device is configured to rotate together with the spindle shaft to perform at least one of deburring in the cleaning bath, cleaning in the cleaning liquid in the cleaning bath, and cleaning in the air for the workpiece.

2. The turret-type cleaning apparatus according to claim 1, the apparatus further comprising a cleaning liquid circulation mechanism including:
a high pressure pump configured to pressurize the cleaning liquid;
a cleaning liquid supply tank disposed at a position higher than the cleaning bath, connected with the second cleaning liquid supply flow passage, and configured to reserve the cleaning liquid therein;
a valve configured to selectively open and close, the valve being provided for the cleaning liquid supply tank;
a drain flow passage configured to drain the cleaning liquid from the cleaning chamber;
a filtration device configured to filtrate the cleaning liquid sent through the drain flow passage; and
a controller configured to adjust a supply flow volume of the cleaning liquid,
wherein the cleaning liquid supply tank has a pipe which lengthens downward from a bottom of the cleaning liquid supply tank and is connected with the second cleaning liquid supply flow passage, and
wherein the valve is disposed at a bottom of the pipe.

* * * * *